(12) United States Patent
Naccache et al.

(10) Patent No.: US 9,141,793 B2
(45) Date of Patent: Sep. 22, 2015

(54) METHOD FOR SECURING A MICROPROCESSOR, CORRESPONDING COMPUTER PROGRAM AND DEVICE

(75) Inventors: David Naccache, Paris (FR); Nora Dabbous, Suresnes (FR)

(73) Assignee: INGENICO GROUP, Paris (FR)

( * ) Notice: Subject to any disclaimer, the term of this patent is extended or adjusted under 35 U.S.C. 154(b) by 1305 days.

(21) Appl. No.: 12/344,370

(22) Filed: Dec. 26, 2008

(65) Prior Publication Data

US 2009/0172268 A1 Jul. 2, 2009

(30) Foreign Application Priority Data

Dec. 26, 2007 (FR) ...................................... 07 60359

(51) Int. Cl.
*G06F 12/14* (2006.01)
*G06F 21/55* (2013.01)
*G06F 21/75* (2013.01)

(52) U.S. Cl.
CPC .............. *G06F 21/558* (2013.01); *G06F 21/75* (2013.01)

(58) Field of Classification Search
CPC ......... G06F 21/70; G06F 21/74; G06F 21/79; G06F 21/50; G06F 21/52; G06F 21/71; G06F 21/72; G06F 21/558; G06Q 20/341
USPC ............ 726/26; 380/277; 713/189, 194, 300, 713/340
See application file for complete search history.

(56) References Cited

U.S. PATENT DOCUMENTS

| | | | | |
|---|---|---|---|---|
| 4,521,852 A | * | 6/1985 | Guttag | 711/163 |
| 4,685,056 A | * | 8/1987 | Barnsdale et al. | 711/164 |
| 5,944,833 A | * | 8/1999 | Ugon | 713/400 |
| 6,295,606 B1 | * | 9/2001 | Messerges et al. | 713/189 |
| 6,698,662 B1 | * | 3/2004 | Feyt et al. | 235/492 |
| 6,965,977 B2 | * | 11/2005 | Yi | 711/169 |
| 7,085,378 B1 | | 8/2006 | Clavier et al. | |
| 7,471,791 B1 | * | 12/2008 | Coron et al. | 380/29 |

(Continued)

FOREIGN PATENT DOCUMENTS

| | | | | |
|---|---|---|---|---|
| DE | 198 28 936 | | 12/1999 | |
| FR | 2 860 933 | | 4/2005 | |
| JP | 2003233789 | * | 8/2003 | ........... G06K 19/073 |

OTHER PUBLICATIONS

Thomas S. Messerges and Robert H. Sloan : Examining Smart-Card Security under the Threat of Power Analysis Attacks, IEEE Transactions on Computers, vol. 51, No. 5, May 2002.*

(Continued)

*Primary Examiner* — Catherine Thiaw
(74) *Attorney, Agent, or Firm* — David D. Brush; Westman, Champlin & Koehler, P.A.

(57) ABSTRACT

A method is provided for securing a microprocessor containing at least one main program, which operates with at least one memory. The method includes implementing counter-measures, during which additional operations, that are not required for the main program, are implemented so as to modify the consumption of current and/or the processing time of the microprocessor. The method also includes: identification of at least one address or one memory zone of the memory(ies), called critical addresses, and which contain, or which may contain, critical data for said main program; monitoring the addressing ports of the memory(ies), so as to detect the access to the critical address(es); and activation of the step of implementing counter-measures, when an access to the critical address(es) is detected.

6 Claims, 1 Drawing Sheet

(56) References Cited

U.S. PATENT DOCUMENTS

| | | | |
|---|---|---|---|
| 7,620,832 B2* | 11/2009 | Kissell | 713/324 |
| 8,095,993 B2* | 1/2012 | Shu et al. | 726/34 |
| 8,108,641 B2* | 1/2012 | Goss et al. | 711/163 |
| 8,184,810 B2* | 5/2012 | Furuyama | 380/239 |
| 2001/0016910 A1 | 8/2001 | Tanimoto et al. | 713/172 |
| 2003/0118190 A1 | 6/2003 | Sedlak et al. | 380/277 |
| 2004/0083366 A1* | 4/2004 | Nachenberg et al. | 713/170 |
| 2004/0143720 A1* | 7/2004 | Mansell et al. | 711/206 |
| 2004/0177261 A1* | 9/2004 | Watt et al. | 713/193 |
| 2005/0097250 A1 | 5/2005 | Klug et al. | 710/107 |
| 2005/0171904 A1* | 8/2005 | Yacobi et al. | 705/40 |
| 2005/0273631 A1* | 12/2005 | Shu et al. | 713/190 |
| 2006/0112436 A1* | 5/2006 | Modave | 726/34 |
| 2006/0294236 A1* | 12/2006 | Bar-El | 709/225 |
| 2007/0180541 A1* | 8/2007 | Shu et al. | 726/34 |
| 2007/0250703 A1* | 10/2007 | Giraud et al. | 713/154 |
| 2007/0286413 A1* | 12/2007 | Derouet | 380/28 |
| 2008/0019507 A1* | 1/2008 | Fontana et al. | 380/28 |
| 2008/0019509 A1* | 1/2008 | Al-Gahtani et al. | 380/30 |
| 2008/0022146 A1* | 1/2008 | Kocher et al. | 713/600 |
| 2008/0155679 A1* | 6/2008 | Sebot et al. | 726/16 |
| 2008/0189557 A1* | 8/2008 | Pipitone et al. | 713/193 |
| 2008/0209550 A1* | 8/2008 | Di Iorio | 726/22 |
| 2008/0235796 A1* | 9/2008 | Buhr | 726/22 |
| 2009/0116644 A1* | 5/2009 | Klimov | 380/252 |

OTHER PUBLICATIONS

French Search Report from counterpart foreign application No. 07/60359.

Hagai Bar-el et al., "The Sorcerer's Apprentice Guide to Fault Attacks," Internet Citation—XP002329915.

Kommerling O. et al., "Design principles for tamper-resistant smart card processors."

* cited by examiner

METHOD FOR SECURING A MICROPROCESSOR, CORRESPONDING COMPUTER PROGRAM AND DEVICE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the security of objects with microprocessors, also called electronic chips, and/or programs designed to be incorporated into such objects with electronic chips.

The disclosure especially applies to microprocessors and/or programs integrated into chip cards. Consequently below, essentially such chip cards will be described, however the disclosure may easily be applied to any type of object, especially portable, that is fitted with such a chip, regardless of its nature.

BACKGROUND OF THE DISCLOSURE

Chip cards have been used for a long time, especially to identify or authenticate a product, an account and/or a person. The chip, or microprocessor, therefore has a specific transistor structure, which defines a processing logic and memory zones, of which at least part are secured, containing secret data.

This secret data, also known as secured or critical data, is protected by different types of protective measures, for example to prevent the cloning of cards in which they are stored, or information being obtained (such as a secret identification code) permitting fraudulent use of a stolen card.

For example, one security technique consists of storing this data in memory zones that are not accessible and non-modifiable.

There are also protective measures called counter-measures, which consist of masking the current consumption of a card to "outside observers", when the card is in use, by scrambling this consumption or by presenting a chaotic current consumption, that is not representative of the actual consumption of current in the card.

Indeed, failing access to the critical data, a malevolent person may obtain, by observing the consumption of current of a card when in use, useful information about the logic operations carried out.

The implementation of these counter-measures therefore permits the current consumption of a card to be masked when it is in use.

This technique corresponds for example to the activation of additional logic operations, that are not required for the operation of the card, and which cause additional consumption of current, that is not representative of the actual operation of the card.

These counter-measures may be systematically activated during the operation of the card, in order to protect the critical data that may be handled during the operation.

One disadvantage of this technique of the prior art lies in the fact that the activation of these counter-measures is costly in terms of energy consumption of the card.

Furthermore, another disadvantage lies in the fact that the activation of additional operations is costly in terms of the size of the code.

Finally, this security technique based on the activation of counter-measures is also costly in terms of time spent for programming.

There is another security technique which uses counter-measures, limiting the above disadvantages, which consists of only activating the counter-measures at certain moments during the operation of the card.

For example, the main program which carries out the operation of the card may be modified so as to plan the activation of counter-measures at moments that are defined as critical. For example, these moments may correspond to parts of the program code, or programmed actions, which handle data that is identified as critical. These critical moments are identified by the author of the program.

One disadvantage of this technique lies in the fact that it does not guarantee that all of the critical data is secured, as the program may have forgotten to identify part of the code as critical, or has misjudged the security level of an action or part of the code.

SUMMARY

An embodiment of the disclosure proposes a new solution which does not have all of the disadvantages of the prior art. In one example, an aspect of the disclosure relates to a method for securing a microprocessor containing at least one main program, which operates with at least one memory, wherein said method comprises a step for implementing counter-measures, during which additional operations, that are not required for said main program, are implemented so as to modify the consumption of current and/or the processing time of said microprocessor.

According to an aspect of the disclosure, such a method comprises the following steps:
  identification of at least one address or one memory zone of said memory(ies), called critical addresses, and which contain, or which may contain, critical data for said main program;
  monitoring of the addressing ports of said memory(ies), so as to detect the access to said critical address(es);
  activation of said step for implementing counter-measures, when an access to said critical address(es) is detected.

Consequently, an aspect of the disclosure is based on a new and inventive approach to the securing of a microprocessor, based on the identification of zones or memory storage addresses for critical data used for the operation of the microprocessor, and on the activation of counter-measures for every access to one or several of the zones or addresses previously identified.

For example, this data serves a main program which operates the microprocessor. Critical data for such a microprocessor may correspond for example to identification codes for a card used for electronic payment, or biometric information, for example for a card providing secure access which requires the authentication of its user. This data may also be used by one or several peripheral devices which dialogue with the card.

Contrary to the techniques of the prior art which identified the critical data itself to try to protect them, the method according to an aspect of the disclosure identifies the memory zones where this data is stored and secures all accesses to these memory zones, thus securing the data itself.

The security of the card is ensured by the activation of counter-measures, which permit the current to be scrambled during the periods when the operation of the card requires access to one or several items of critical data.

The method according to an aspect of the disclosure permits an optimisation of the use of the counter-measures, only during the "crucial" periods of the operation of the card, and no longer systematically during the operation.

The method comprises in particular a step where the addressing ports of said memory(ies) are monitored.

Consequently, each access to a critical address, by the main program of the card, or by one of the peripheral devices, is monitored and detected, so as to activate the counter-measures. Consequently, the monitoring of all accesses to the memory addresses identified as critical (as they store critical data), permit the security of this critical data to be optimised, independently of the choice of the author of a program, contrary to a technique of the prior art. Indeed, as all of the critical data is stored in memory zones which are themselves identified as critical, the systematic monitoring of the accesses, for reading, writing, executing codes, etc, to these memory zones permits counter-measures to be activated each time that an item of this critical data is handled.

According to one specific aspect of the disclosure, the method comprises a step which interrupts said step for implementing counter-measures, as soon as said critical address (es) are no longer used.

Consequently, the counter-measures are deactivated as soon as the addresses identified as critical are no longer used, so as to limit the costly effects, in terms of time, consumption of current, etc, of the activation of the counter-measures.

Indeed, the latter are only activated in the period when one or several items of critical data are handled, wherein this period is detected by monitoring of the access to the critical addresses identified beforehand.

For example, said step for implementing counter-measures comprises at least one of the operations from the following group:
  the carrying out of random mathematical or logic operations;
  the duplication of operations carried out by said main program;
  the launch of a secondary camouflage program.

Consequently, the counter-measures may for example correspond to mathematical or logic operations which do not serve the operation of the card itself, but which lead to excess current consumption, preventing an observer from distinguishing the working operations, and the critical data handled, from the operations related to the counter-measures.

The counter-measures may correspond to operations of the main program, for example duplicated operations, or the operations of a secondary program, known as a camouflage program, which only comprise counter-measure operations, and possibly the monitoring code of the addressing ports.

According to one embodiment, said identification step designates at least one address or one memory zone comprising at least one of the elements from the group comprising:
  a portion of code of said main program;
  secured data.

Consequently, the critical addresses may be identified as addresses at which critical data is stored directly, or addresses where portions of code also considered as critical are stored. Critical data may be for example biometric information, identification codes, etc.

In particular, said memories belong to the group comprising:
  RAM memories;
  ROM memories;
  EPROM memories;
  EEPROM memories;
  flash memories.

Another aspect of the disclosure relates to a computer program product that can be downloaded from a communication network and/or saved onto a support that can be read by a computer and/or run by a processor, comprising program code instructions for the implementation of the security method as previously described.

An aspect of the disclosure also relates to a secure microprocessor device containing at least one main program, which operates with at least one memory, said device comprising means of implementing counter-measures, during which additional operations, that are not required for said main program, are implemented so as to modify the consumption of current and/or the processing time of said microprocessor.

According to an aspect of the disclosure, such a device comprises:
  means of identifying at least one address or one memory zone of said memory(ies), called critical addresses, and containing, or likely to contain, critical data for said main program;
  means of monitoring addressing ports of said memory(ies), so as to detect an access to said critical address(es);
  means of activating said means of implementing counter-measures, when an access to said critical address(es) is detected.

Such a device is especially suitable for implementing the security method previously described.

For example, such a device is in the form of a microprocessor card.

BRIEF DESCRIPTION OF THE DRAWINGS

Other features and advantages of one or more aspects of the disclosure will become clearer upon reading the following description one a specific embodiment, provided purely by way of non-restrictive illustration, and appended drawings among which.

DETAILED DESCRIPTION OF ILLUSTRATIVE EMBODIMENTS

1. General Principle

The general principle of an aspect of the disclosure lies in the identification and the monitoring of memory addresses, or memory zones, that are critical, which is to say in which critical data is stored, or may be stored, in a microprocessor. At each access to the one of these critical addresses, counter-measures are activated, permitting the data handled in these accesses to the memory to be secured.

The method according to an aspect of the disclosure permits the optimisation of the activation of counter-measures at crucial moments of the operation of the microprocessor, and therefore the optimisation of the security of the critical data in the microprocessor.

2. Description of an Embodiment

Figure 1:
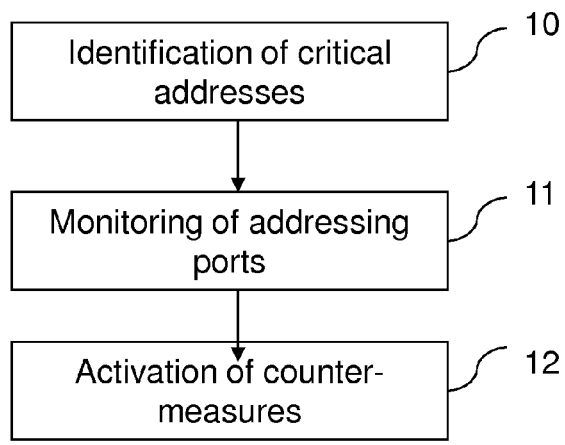
FIG. 1 shows the main steps of the method according to an aspect of the disclosure.
Figure 2:
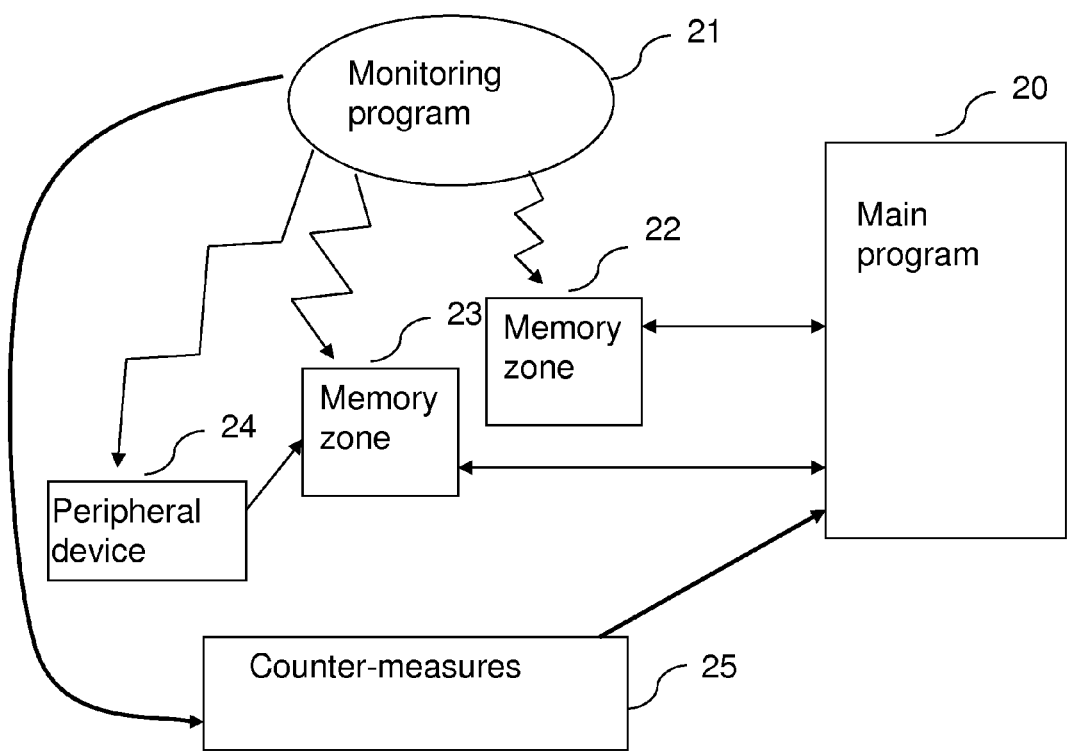
FIG. 2 illustrates an example of a security device using a security technique according to one aspect of the disclosure.

In relation to FIGS. 1 and 2, the main steps of the security method according to an aspect of the disclosure will now be described.

Let us consider a microprocessor, or a card, containing at least one main program 20. For example, this card is an electronic payment card. A user may use it to make an electronic payment, or to withdraw cash from a dispenser, and must identify him/herself with a personal code. This personal code is part of the critical data to be secured, and therefore to be backed up in one or several specific memories which operate with the microprocessor. The part of the code which permits the authentication of the card user may also be part of the data to be secured. Certain items of information concerning for example the bank details of the user may also be stored in a secure memory zone.

In a first step 10, the security method according to an aspect of the disclosure identifies one or several memory zones 22-23 containing or able to contain critical data. These memory zones, 22-23 may be used by the main program 20, or by one or several peripheral devices 24 which interact with the microprocessor.

These memory zones 22-23 are identified by addressing ports, and especially contain the critical data described above, such as the identification code of the user, his/her bank details, and the part of the main program 20 which permits the authentication of the user. Once all of these memory zones 22-23 are identified, the author of the main program 20 must take them into account for the storage of all critical data used in the main program 20 in these specific memory zones 22-23.

Consequently, contrary to the prior art where the actions to be secured must be identified before, or at the time of the programming of the main program 20, so that the counter-measures are consequently activated, the memory zones 22-23 are here identified prior to the programming, and the author of the program simply has to take them into account to store the critical data in them.

According to this embodiment of the disclosure, a monitoring program 21, that is distinct from the main program 20, is responsible for monitoring during a step 11, the addressing ports of these memory zones 22-23 that have been identified beforehand.

Consequently, as soon as the main program 20, or a peripheral device 24, accesses one of the memory zones, 22-23, the monitoring, program 21 issues an alert, which activates the counter-measures 25 provided to secure the data handled by the access memory in question. This activation of the counter-measures 25 (step 12), corresponds for example to the activation of a flag, indicating that an access to a critical memory address is in progress.

For example, the monitoring program 21 may include a succession of tests, consisting of detecting all of the accesses to the addressing ports of the memory zones 22-23, and of activating counter-measures 25 every time a positive detection is made.

The counter-measures 25 may be described in the monitoring program 21 and may correspond for example to a succession of random mathematical or logic operations, implemented during the entire duration of the access to the memory address detected.

Consequently, all of the actions related to the access to the memory address, which is to say all of the actions which handle one or several items of critical data, are masked by counter-measures 25 activated during the entire duration of the access to the memory, and are thus secured.

At the end of each access to a critical memory zone 22-23, the counter-measures 25 are deactivated, to avoid unnecessary excess consumption of current.

According to one variant of this embodiment, additional counter-measures may also be implemented, in the main program 20. For example, the author of the main program may wish to secure part of the code of the main program 20, which does not involve critical data, but which requires in his/her opinion a certain degree of security. He/she may then activate counter-measures, by activating a flag in the code, according to the same principle as for the activation of counter-measures previously described.

Although the present disclosure has been described with reference to one or more examples, workers skilled in the art will recognize that changes may be made in form and detail without departing from the scope of the disclosure and/or the appended claims.

What is claimed is:

1. A method for securing a microprocessor containing at least one main program, which operates with at least one memory, wherein said method comprises:
    identifying at least one address or one memory zone of said at least one memory, called critical addresses, and which contain, or which are configured to contain, critical data for said main program;
    monitoring, by said microprocessor, the addressing ports of said at least one memory, so as to detect access to said critical addresses;
    issuing an alert when an access to said critical addresses is detected by said microprocessor;
    when said alert is issued, activating a step of implementing counter-measures, by said microprocessor, during which additional operations, that are not required for said main program, are implemented so as to modify consumption of current and/or processing time of said microprocessor, without interrupting the access to said critical addresses, wherein said implementing counter-measures comprises duplicating operations carried out by said main program; and
    deactivating said counter-measures as soon as said critical addresses are no longer used.

2. The method according to claim 1, wherein said identifying designates at least one address or one memory zone comprising at least one of the elements from the group comprising:
    a portion of code of said main program; and
    secured data.

3. The method according to claim 1, wherein said at least one memory belongs to the group comprising:
    RAM memory;
    ROM memory;
    EPROM memory;
    EEPROM memory; and
    flash memory.

4. A computer program product saved onto a non-transitory, computer-readable support and executable by a microprocessor, wherein said program comprises program code instructions for the implementation of a method for securing the microprocessor, which contains at least one main program and operates with at least one memory, wherein said method comprises:
    identifying at least one address or one memory zone of said at least one memory, called critical addresses, and which contain, or which are configured to contain, critical data for said main program;

monitoring the addressing ports of said at least one memory, by said microprocessor, so as to detect the access to said critical addresses;

issuing an alert when an access to said critical addresses is detected by said microprocessor;

when said alert is issued, activating, by said microprocessor, a step of implementing counter-measures, during which additional operations, that are not required for said main program, are implemented so as to modify consumption of current and/or processing time of said microprocessor, without interrupting the access to said critical addresses, said step of implementing counter-measures comprises duplicating operations carried out by said main program; and deactivating said counter-measures as soon as said critical addresses are no longer used.

5. A secure microprocessor device, said secure microprocessor device containing at least one main program, which operates with at least one memory, wherein said secure microprocessor device comprises:

means for identifying at least one address or one memory zone of said at least one memory, called critical addresses, and containing, or configured to contain, critical data for said main program;

means for monitoring addressing ports of said at least one memory, so as to detect an access to said critical addresses;

means for issuing an alert, when an access to said critical addresses is detected;

means for implementing counter-measures, during which additional operations, that are not required for said main program, are implemented so as to modify consumption of current and/or processing time of said secure microprocessor device, without interrupting the access to said critical addresses, said means for implementing counter-measures comprising means for performing duplicating operations carried out by said main program;

means for activating said means for implementing counter-measures, when said alert is issued; and means for deactivating said counter-measures as soon as said critical addresses are no longer used.

6. The secure microprocessor device according to claim 5, wherein said device is in the form of a microprocessor card.

* * * * *